United States Patent Office 3,631,115
Patented Dec. 28, 1971

3,631,115
TELOMERIZATION PROCESS FOR THE PREPARATION OF HALOGENATED HYDROCARBONS
Kunio Nakagawa, Nishinomiya-shi, Hyogo, and Tadashi Nakata, Ibaragi-shi, Osaka, Japan, assignors to Shionogi & Co. Ltd., Osaka, Japan
No Drawing. Application Mar. 7, 1967, Ser. No. 621,151, now Patent No. 3,429,934, dated Feb. 25, 1969, which is a division of application Ser. No. 252,554, Jan. 12, 1963, now Patent No. 3,309,393, dated Mar. 14, 1967. Divided and this application Feb. 28, 1968, Ser. No. 734,181
Int. Cl. C07c 17/08, 17/10, 17/28
U.S. Cl. 260—648 C                        6 Claims

ABSTRACT OF THE DISCLOSURE

A taxogen selected from the group consisting of alkenes with a maximum of 8 carbon atoms, the corresponding halogenoalkanes and halogenoalkenes, butadiene and isoprene, is telomerized with a telogen selected from the group consisting of halogeno(lower)alkanes, halogenoethylenes and hydrohalic acids with production of addition product thereof in the form of halogenated hydrocarbon, by reacting the telogen with the taxogen in the presence of nickel peroxide at a temperature from ambient temperature to the decomposition temperature of one of the telogen, the taxogen and their addition product, the said nickel peroxide being the product of the treatment of a salt of nickel selected from the group consisting of nickel chloride, nickel bromide, nickel sulfate, nickel carbonate and nickel nitrate with an oxidizing agent selected from the group consisting of alkali hypohalite and alkali persulfate in aqueous alkaline medium at a temperature between 10° and 25° C., and containing about 0.3 to $0.4 \times 10^{-2}$ gram-atom of active oxygen per gram.

This application is a division of copending application Ser. No. 621,151, filed on Mar. 7, 1967, and now Pat. No. 3,429,934, which in turn is a divisional application of Ser. No. 252,554, filed Jan. 12, 1963, and now Pat. No. 3,309,393.

The present invention relates to a novel telomerization process. More particularly, it relates to a process for reacting a telogen with a taxogen in the presence of nickel peroxide to produce halogenated hydrocarbon as telomer.

In the present specification, the term "telomerization" may be understood as "the process of reacting under polymerization conditions, a molecule Y—Z which is called a "telogen" with one or more than one unit of a polymerizable compound having ethylenic unsaturation called a "taxogen" to form products called "telomers" having the formula: Y—(A)$_n$—Z, where (A)$_n$ is a divalent radical formed by chemical union, with the formation of new carbon bonds of the taxogen, the unit A being called a "taxomon," n being any integer greater than zero, and Y and Z being fragments of the telogen attached to both terminals of the taxomon or a chain of taxomons," although the process wherein a telogen is reacted with only one unit of a taxogen to form a telomer having the formula: Y—(A)$_1$—Z is excluded from the category of "telometrization" in some text books [e.g., H. Gilman: Organic Chemistry, an Advanced Treatise, Volume IV, pp. 1043–1051 (1953)]. Furthermore, the term "nickel peroxide" is expediently applied to designate the amorphous, black, hydrous and higher oxides of nickel which are formed by the reaction between a strong oxidizing agent such as alkali hypohalites or alkali persulfates and freshly precipitated nickelous hydroxide.

Since telomerization can readily produce a variety of useful polymers which are made of several polymerized molecules of a polymerizable substance and the fragments of only one other molecule depending on a suitable control of polymerization conditions, it has been broadly applied in chemical industry.

Telomerization generally proceeds on a free radical mechanism and is initiated by the action of a radical initiator on a telogen. Further, the degree of polymerization is more or less associated with the employed radical initiator. Accordingly, the selection of a suitable radical initiator is an important key to the successful production of the intended product by telomerization.

There have been heretofore known some radical initiating agents of which examples are as follows: acyl peroxides, alkyl peroxides, salts of per acids, aliphatic azo compounds, tetraalkyl leads, tetraphenyl lead, tetraphenyl tin, dialkyl mercuries, organic magnesium compounds, aluminum chloride, zinc chloride, iron-cobalt, nickel carbonyl, etc. Of these radical initiating agents, acyl peroxides (e.g. benzoyl peroxide), alkyl peroxides (e.g. di-tert-butyl peroxide) and aliphatic azo compounds (e.g. azobisiso-butyronitrile) have been broadly and practically employed because of their good producibility of telomers. However, these practically available initiators each is bound up with disadvantages. For instance, organic peroxides such as acyl peroxides and alkyl peroxides must be carefully treated because they are generally explosive to heat. Further, in general, organic initiators inevitably produce a considerable amount of the by-products of which the molecules contain the fragments of the initiators, the latter being difficultly eliminated from the reaction product. These and other disadvantages have been now overcome by the present invention. Thus, it has been discovered that nickel peroxide can initiate the radical reaction in telomerization and possesses a number of advantagous properties as follows:

(1) Nickel peroxide is a kind of peroxide but is stable to heat. Accordingly, it can be safely employed in telomerization.

(2) Nickel peroxide is insoluble in any solvent except acids, and the telomerization reaction can proceed in heterogeneous phase, unless the reaction medium is acidic. This makes advantageously possible easy separation of the radical initiator from the reaction mixture by a simple operation.

(3) Nickel peroxide does not product such unavoidable by-products as produced in the use of organic radical initiators. Accordingly, the recovery of telomers can be readily accomplished.

(4) Nickel peroxide is a black substance and, after the accomplishment of telomerization, changes to inactive nickelous hydroxide which is a green substance. Accordingly, it is possible to know the end point of consumption of the catalyst by the observation of the colour-changing.

(5) Nickel peroxide can be readily prepared by treating an inorganic nickel salt with a strong oxidizing agent such as alkali hypohalites and alkali persulfates, these starting materials being available at low cost. Furthermore, the agent inactivated as the result of the use in telomerization can be easily renewed by a simple procedure, i.e. the treatment with a strong oxidizing agent as stated above. Accordingly, it is an economical radical initiating agent.

(6) Nickel peroxide is an excellent radical initiating agent of as good activity as benzoyl peroxide which has been heretofore the most widely employed. For instance, the yield ratios of 1,1,1-trichloro-3-bromononane in telomerization of trichlorobromomethane with octene-1 by the use of a variety of radical initiators are compared in the following Table I:

TABLE I

| Radical initiator: | Yield ratio of 1,1,1-trichloro-3-bromononane, percent |
|---|---|
| (a) Thermal | 50 |
| (b) Photochemical | 44.5 |
| (c) Acetyl peroxide | 30 |
| (d) Benzoyl peroxide | 35.6 |
| (e) Iron-cobalt powder | 83 |
| (f) Nickel carbonyl | 40.5 |
| (g) Nickel peroxide | 91 |

Note: The yield ratios were calculated on the basis of the theoretical yield of 1,1,1-trichloro-3-bromononane to trichloro-bromomethane. The data of (a), (e) and (f) were taken from the report by Müller et al. [E. Müller et al.: Ann., 632, 29 (1960)] and those of (b) and (c) from the report by Kharasch et al. [M. S. Kharasch et al., J. Am. Chem. Soc., 69, 1105 (1947)].

Adding to the above advantageous properties, nickel peroxide characteristically yields a telomer having a relatively low degree of polymerization as the telomerization product by suitable control of reaction conditions.

Accordingly, a main object of the present invention is to embody nickel peroxide useful as a radical initiator in telomerization. Another object of this invention is to embody nickel peroxide possessing a number of advantages as a radical initiator in telomerization. A further object of the invention is to embody a telomerization process by the use of nickel peroxide as a radical initiator. These and other objects will be apparent to those conversant with the art to which the present invention pertains.

The nickel peroxide employed in the process of the present invention may be prepared by treating a nickel salt (e.g. nickel chloride, nickel bromide, nickel sulfate, nickel carbonate, nickel nitrate) with a strong oxidizing agent such alkali hypohalites (e.g. sodium hypochlorite, potassium hypochlorite, sodium hypochlorite, sodium hypobromite) or alkali persulfates (e.g. sodium persulfate, potassium persulfate) in an aqueous alkaline medium. One of the presently-preferred procedures for obtaining the highly active nickel peroxide is set forth as follows:

To a solution of nickel sulfate hydrate ($NiSO_4 \cdot 6H_2O$) (130 m.) in water (300 ml.), there is added dropwise a solution of sodium hydroxide (42 g.) in 6% sodium hypochlorite (300 ml.) while stirring, and the resultant mixture is stirred for about 30 minutes at a temperature between 10 and 25° C. The black precipitate is collected by filtration, washed with water to remove active chlorine and, after crushing the cake to powder, dried over anhydrous calcium chloride under reduced pressure.

The nickel peroxide is a black fine powder containing a considerable amount of water. The results of quantitative analysis make it possible to give the molecular formula:

$$Ni_2O_3 \cdot 3H_2O(2Ni(OH)_3) \sim Ni_2O_3 \cdot 4H_2O(Ni_2O_7H_8)$$

to the substance, but the structure has not yet been confirmed. The nickel peroxide possesses usually about $0.3 \sim 0.4 \times 10^{-2}$ g. atom of active oxygen per gram (measured by titrating the iodine, produced from the reaction between the nickel peroxide and potassium iodide in acetic acid, with sodium thiosulfate), of which a considerable portion is lost gradually when heated, but remains for a relatively long time when stored at room temperature under protection against light and atmospheric moisture. Generally speaking, the activity as a radical initiator is reduced gradually while in storage and rapidly on heating. Accordingly, the use of freshly produced nickel peroxide in telomerization is preferred. However, such inactivated nickel peroxide can be readily activated by subjecting the same to the treatment with a strong oxidizing agent as stated above. In this connection, it should be noted that the active nickel peroxide herein described is amorphous, while the commercially available nickel sesquioxide ($Ni_2O_3$) is crystalline and inactive, although the latter can be readily activated in the same manner as stated above. The experimental results on the relation between the chemical compositions and the radical initiating activities of a variety of nickel peroxides obtained depending on the extent of drying and the commercial nickel sesquioxide are shown in the following Table II:

TABLE II

| | Sample | | | | | |
|---|---|---|---|---|---|---|
| | a | b | c | d | e | f |
| Active oxygen (c.-atom/g.) | 0.00390 | 0.00384 | 0.00321 | 0.00400 | 0.00150 | 0 |
| Contaminating chlorine (percent) | 1.157 | 0.150 | Trace | 0.170 | 0.197 | 0 |
| Contaminating sodium hydroxide (mg./g.) | 0.628 | 0.141 | Trace | 0.697 | 0.770 | 0 |
| Nickel (percent) | 41.7 | 42.1 | 42.3 | 55.0 | 60.8 | 64.7 |
| Nickel (corrected) (percent) | 65.1 | 55.8 | | 62.8 | 70.6 | 70.8 |
| Water (percent) | 22.32 | 23.89 | | 15.12 | 4.60 | 0 |
| Activity | 88.1 | 91.3 | 90.7 | 45.3 | Inactive | Inactive |
| Presumed molecular formula | $Ni_2O_3 \cdot 3H_2O$ | | | (¹) | $Ni_2O_3$ | |

¹ $Ni_2O_3 \cdot 1.2 H_2O$.

NOTE: The samples (a) and (b) were prepared according to the typical procedure mentioned above and dried at 23 to 25° C. in a desiccator to a constant amount. The sample (c) was prepared and dried in the same manner as in the preparation of the samples (a) and (b), but washed with sufficiently more water in the course of the recovery operation than the latter. The samples (d) and (e) were obtained by drying the sample (a) at 80° C. under a pressure of 2 mm. Hg and at 180° C. under a pressure of 2 mm. Hg, respectively. The sample (f) is a commercial nickel sesquioxide. The activity is represented by the theoretical yield ratio telogen (trichlorobromomethane), when the telomerization is carried out between trichlorobromomethane (0.4 mole) and octene-1 (1 mole) in the presence of nickel peroxide containing 0.10 g.-atom of active oxygen at 70° C. for 4 hours. In the case of the sample (f), 0.1 mole of the same was used.

The probable mechanism of the telomerization according to the process of the present invention is representable by the following formulae (wherein nickel peroxide is expediently shown as $Ni(OH)_3$):

$Ni(OH)_3 + Y—Z \rightarrow Ni(OH)_2 + Y—OH + Z \cdot$ —Initiation
$Z \cdot + A \rightarrow Z—A \cdot$
$ZA \cdot + (n-1)A \rightarrow Z—(A)_n \cdot$ —Propagation
$Z—(A)_n \cdot + Y—Z \rightarrow Z—(A)_n—Y + Z \cdot$ —Transfer
$Z \cdot + Z \cdot \rightarrow Z—Z$ —Termination In these formulae, Y—Z is a telogen, Y and Z each being a fragment of the telogen. As the telogen, there may be employed organic or inorganic compounds having a halogen or hydrogen atom which can be abstracted therefrom. More specifically, there may be exemplified halogenoalkanes (e.g. carbon tetrachloride, chloroform, dichloromethane, dibromomethane, trichlorobromomethane, dibromodifluoromethane, ethyl iodide, ethyl bromide), halogenoalkenes (e.g. tetrachloroethylene, trichloroethylene), inorganic halogeno compounds (e.g. hydrochloric acid, cyanogen chloride, sulfuryl chloride), alkanes (e.g. butane, cyclohexane), etc. A halogen or hydrogen atom in these telogens is eliminated by the radical initiator, i.e. nickel peroxide, to leave the free radical designated as $Z \cdot$. Which halogen or hydrogen atom is abstracted has been heretofore known on each telogen and some examples are shown in the following Table III:

TABLE III

| Telogen: | Molecular formula [1] |
|---|---|
| Chloroform | H......CCl[3] |
| Carbon tetrachloride | Cl......CCl$_3$ |
| Trichlorobromomethane | Br......CCl$_3$ |
| Bromodichloromethane | Br......CHCl$_2$ |
| Dibromodichloromethane | Br......CCl$_2$Br |
| Trifluoroiodomethane | I......CF$_3$ |
| Chloroiodomethane | I......CH$_2$Cl |

[1] The atom to be eliminated is connected by the dotted line.

As the taxogen represented by A, there may be employed compounds having ethylenic unsaturation. More specifically, there may be exemplified alkenes (e.g. ethylene, propylene, butene-1, isobutylene, octene-1, butadiene, isoprene), halogenoalkenes (e.g. tetrafluoroethylene, trifluorochloroethylene), cyclic alkenes (e.g. cyclohexene), vinyl monomers (e.g. styrene, methacrylic acid, methyl acrylate, vinyl acetate) and the like.

The telomerization may be carried out by reacting a taxogen with a telogen in the presence of nickel peroxide at a suitable temperature. All the reactions in initiation, propagation, transfer and termination can proceed rapidly and successively.

The practical reaction conditions may be decided appropriately, in consideration of the kinds of the telogen and the taxogen, the degree of polymerization of the desired telomer and the like, according to the general knowledge in the field of telomerization. The nickel peroxide, which is preferred to be freshly produced on use and/or stored under the protection from light, atmospheric moisture and atmospheric oxygen, is usually employed in amounts containing from about 0.010 to about 3.000 g.-atom of active oxygen to one molar amount of the taxogen. A wide range of temperatures, from room temperature to over 250° C. may be adopted for the accomplishment of the telomerization. In fact, the upper temperature limit for telomerization is determined only by the thermal stability of the various compounds in the reacting system. The preferred temperature for any given telomerization depends primarily on the taxogen and the telogen being employed. For the majority of cases, the preferred reaction temperature lies somewhere in the range of 50 to 150° C. As, in ordinary cases, the telogen can perform simultaneously as the reaction medium, no other solvent may be needed. The ratio of telogen to taxogen used in telomerization can be varied widely. In general, increasing the ratio of telogen to taxogen decreases the average molecular weight of the product. The preferred molecular ratio of telogen to taxogen will depend upon the nature of the reactants and the chain length of the product desired, but will generally be in the range of 10:1 to 1:10. It must be emphasized that the average chain length of the telomer, i.e. the number of taxomon units, is a function of the concentration of taxogen which is maintained in the reaction system, and, when the taxogen is a gas, this is dependent on the reaction pressure. Moreover, the average chain length of the telomer in a given reaction also depends on the nature of the taxogen employed, some taxogens being more active than others. As the atmospheric oxygen acts on the telomerization as an inhibitor, the reaction is normally desired to be executed in an inert gas (e.g. nitrogen, carbon dioxide). The telomerization may be usually executed with or without any regulation of reaction pressure. However, when such low boiling monomers as ethylene and vinyl chloride are employed, it is necessary that the reaction is carried out under pressure in order to obtain the necessary concentration of monomer for telomerization. Generally speaking, the execution of telomerization under a higher pressure affords a higher average chain length of telomer. In all cases, good dispersion is desired and this may be attained simply by shaking or rigorous stirring of the reaction mixture. The process may be aided by the addition of dispersing agents.

The recovery of the telomerization product from the reaction mixture may be carried out by separating the nickel peroxide and treating the resultant in per se conventional manners (e.g. extraction, distillation). The nickel peroxide employed in telomerization can be readily renewed by a simple procedure, i.e. the treatment of the nickel peroxide with a strong oxidizing agent such as alkali hypohalites or alkali persulfates in an aqueous alkaline medium. An example of the presently-preferred renewal procedure is shown as follows:

The collected nickel peroxide is washed with water, stirred with 6% sodium hypochlorite (about ten times the quantity of nickel peroxide) in an aqueous alkaline medium for 20 minutes, filtered, washed with water and dried.

The products of the present invention are valuable for a wide variety of uses, depending upon their chemical constitution. For instance, those containing a halogen atom may be subjected to the usual reactions of organic halides to obtain alcohols, amines, nitrides, esters, etc. Those products may, depending upon the average chain length, be used as solvents, lubricants, wax substitutes, synthetic fibers, surface active agents, moulding powders, plasticizers or perfumes, or intermediates thereof (e.g. Burland et al.: U.S. 2,868,837].

The following examples illustratively set forth presently-preferred embodiments of the invention.

In these examples, the nickel peroxide is prepared according to the method hereinabove disclosed and, after the measurement of the active oxygen contained therein by iodometry, subjected to telomerization. The yield percent shows the value calculated on the following equation:

$$\text{Yield Percent} = \frac{\text{Amount of Telomer (grams)}}{\text{Amount of Taxogen (grams)}} \times 100$$

The molecular formulae of highly polymerized telomers are shown on the basis of the average molecular weight. M.W. means molecular weight.

EXAMPLE 1

To a mixture of octene-1 (1 mole) and chloroform (4 moles), there is added nickel peroxide containing 0.048 g.-atom of active oxygen, and the resultant mixture is stirred for 7.5 hours at 63° C. in nitrogen stream. Then, the inactivated and green colored catalyst (nickelous hydroxide) is collected by filtration and washed with chloroform. The washing chloroform and the filtrate are combined together. The solvent and the unreacted starting materials are evaporated in fresh nitrogen stream. The residue is fractionally distilled to give a compound corresponding to the formula: H(C$_8$H$_{16}$)CCl$_3$(1,1,1-trichlorononane) as a fraction boiling at 100 to 105° C./5 mm. Hg in the yield of 12.4% and a compound corresponding to the formula: H(C$_8$H$_{16}$)$_2$CCl$_3$ as a fraction boiling at 168 to 170° C./4 mm. Hg in the yield of 2.7%.

*Analysis.—*
Calcd. for C$_9$H$_{17}$Cl$_3$ (percent): C, 46.67; H, 7.39; Cl, 45.93. Found (percent): C, 46.61; H, 7.83; Cl, 43.14.
Calcd. for C$_{17}$H$_{33}$Cl$_3$ (percent): C, 59.38; H, 9.67; Cl, 30.93. Found (percent): C, 59.24; H, 9.31; Cl, 30.47.

EXAMPLE 2

To a mixture of octene-1 (1 mole) and bromoform (2 moles), there is added nickel peroxide containing 0.098 g.-atom of active oxygen, and the resultant mixture is stirred for 1 hour at 80° C. in nitrogen stream. The reaction mixture is treated as in Example 1 whereby a compound corresponding to the formula:

Br(C$_8$H$_{16}$)CHBr$_2$(1,1,3-tribromononane)

is obtained as a fraction boiling at 135 to 138° C./5 mm. Hg in the yield of 53.7%.

*Analysis.*—Calcd. for $C_9H_{17}Br_3$ (percent): C, 29.61; H, 4.69; Br, 65.68; M.W., 364.9. Found (percent): C, 30.57; H, 4.84; Br, 64.11; M.W., 354.5.

EXAMPLE 3

To a mixture of octene-1 (1 mole) and carbon tetrachloride (3 moles), there is added nickel peroxide containing 0.121 g.-atom of active oxygen, and the resultant mixture is stirred for 2 hours at 80° C. in nitrogen stream. The reaction mixture is treated as in Example 1 whereby a compound corresponding to the formula:

$$Cl(C_8H_{16})CCl_3 (1,1,1,3\text{-tetrachlorononane})$$

and a compound corresponding to the formula:

$$Cl(C_8H_{16})_2CCl_3$$

are obtained as a fraction boiling at 190 to 200° C./50 mm. Hg in the yield of 44.1% and a fraction boiling at 161 to 165° C./5 mm. Hg in the yield of 4.9%, respectively.

*Analysis.—*

Calcd. for $C_9H_{16}Cl_4$ (percent): C, 40.63; H, 6.06; Cl, 53.30. Found (percent): C, 41.16; H, 6.34; Cl, 52.00.

Calcd. for $C_{17}H_{32}Cl_4$ (percent): C, 53.97; H, 8.53; Cl, 37.49; M.W.: 378.2. Found (percent): C, 53.63; H, 8.40; Cl, 36.08; M.W.: 365.2.

EXAMPLE 4

To a mixture of octene-1 (1 mole) and carbon tetrabromide (1.5 moles), there is added nickel peroxide containing 0.041 g.-atom of active oxygen, and the resultant mixture is stirred for 2 hours at 80° C. in nitrogen stream. The insoluble substance (nickelous hydroxide) is collected by filtration while hot and washed with ether. The washing ether and the filtrate are combined together. The solvent and the unreacted starting materials are evaporated in fresh nitrogen stream. After removal of the still remained carbon tetrabromide by a sublimation procedure, the residue is fractionally distilled to give a compound corresponding to the formula:

$$Br(C_8H_{16})CBr_3 (1,1,1,3\text{-tetrabromononane})$$

as a fraction boiling at 165 to 168° C./4 mm. Hg in the yield of 227%.

*Analysis.*—Calcd. for $C_9H_{16}Br_4$ (percent): C, 24.35; H, 3.63; Br, 72.01. M.W.: 443.8. Found (percent): C, 24.65; H, 3.77; Br, 71.94. M.W.: 437.7.

EXAMPLE 5

To a mixture of styrene (1 mole) and chlorofrom (4.1 moles), there is added nickel peroxide containing 0.106 g.-atom of active oxygen, and the resultant mixture is stirred for 4 hours at 70° C. in nitrogen stream. The reaction mixture is treated as in Example 1 to give a compound corresponding to the formula: $H(C_8H_8)CCl_3$ ((3,3,3-trichloropropyl)benzene) as a fraction boiling at 166 to 167° C./4 mm. Hg in the yield of 3.2%, a compound corresponding to the formula: $H(C_8H_8)_5CCl_3$ as a fraction boiling at 205 to 206° C./2 mm. Hg (M.P. 84 to 85° C.) in one yield of 10.8% and a compound corresponding to the formula: $H(C_8H_8)_{17}CCl_3$ as a distillation residue melting at 115 to 120° C. in the yield of 59.0%.

*Analysis.—*

Calcd. for $C_9H_9Cl_3$ (percent): C, 48.32; H, 4.30; Cl 47.65; M.W.: 223.5. Found (percent): C, 48.34; H, 3.67; Cl, 47.57; M.W.: 218.4.

Calcd. for $C_{41}H_{41}Cl_3$ (percent): C, 76.91; H, 6.45; Cl, 16.63; M.W.: 640.1. Found (percent): C, 76.98; H, 6.90; Cl, 14.54; M.W.: 630.9.

Calcd. for $C_{137}H_{137}Cl_3$ (percent): C, 87.06; H, 7.36; Cl, 5.62; M.W.: 1889.8. Found (percent): C, 87.02; H, 7.27; Cl, 5.33; M.W.: 1874.4.

EXAMPLE 6

To a mixture of styrene (1 mole) and bromoform (4.1 moles), there is added nickel peroxide containing 0.106 g.-atom of active oxygen, and the resultant mixture is stirred for 3 hours at 110° C. in nitrogen stream. The reaction mixture is treated as in Example 1 to give a compound corresponding to the formula: $Br(C_8H_8)_{3.2}CHBr_2$ as a reaction product decomposing at a temperature higher than 100° C. in the yield of 66.6%.

*Analysis.*—Calcd. for $C_{26.6}H_{26.6}Br_3$ (percent): C, 54.51; H, 4.50; Br, 40.90; M.W.: 585.9. Found (percent): C, 53.81; H, 4.49; Br, 40.81; M.W.: 582.4.

EXAMPLE 7

To a mixture of styrene (1 mole) and carbon tetrachloride (6 moles), there is added nickel peroxide containing 0.200 g.-atom of active oxygen, and the resultant mixture is stirred for 16 hours at 80° C. in nitrogen stream. The reaction mixture is treated as in Example 1 to give a compound corresponding to the formula: $Cl(C_8H_8)_6CCl_3$ as a fraction boiling at 135 to 138° C./2 mm. Hg in the yield of 3.7%, a compound corresponding to the formula: $Cl(C_8H_8)_{12}CCl_3$ as a fraction boiling at 210 to 215° C./4 mm. Hg (M.P. 92 to 93° C.) in the yield of 82.9% and a compound corresponding to the formula: $Cl(C_8H_8)_{35}CCl_3$ as a distillation residue melting at 148 to 149° C. in the yield of 0.8%.

*Analysis.—*

Calcd. for $C_{49}H_{48}Cl_4$ (percent): C, 75.57; H, 6.21; Cl, 18.21; M.W.: 778.7. Found (percent): C, 75.62; H, 6.99; Cl, 16.92; M.W.: 775.1.

Calcd. $C_{97}H_{96}Cl_4$ (percent): C, 83.00; H, 6.89; Cl, 10.10; M.W.: 1403.6. Found (percent): C, 82.86; H, 7.11; Cl, 8.93; M.W. 1330.6.

Calcd. for $C_{281}H_{279}Cl_4$ (percent): C, 81.81; H, 7.42; Cl, 3.73; M.W.: 3798.8. Found (percent): C, 88.89; H, 7.26; Cl, 3.32; M.W.: 3681.3.

EXAMPLE 8

To a mixture of styrene (1 mole) and carbon tetrabromide (6.1 moles), there is added nickel peroxide containing 0.200 g.-atom of active oxygen, and the resultant mixture is stirred for 4 hours at 90° C. in nitrogen stream. The reaction mixture is treated as in Example 4 to give a compound corresponding to the formula: $Br(C_8H_8)CBr_3$ ((2,3,3,3 - tetrabromopropyl)benzene) as a fraction boiling at 175° C./7 mm. Hg (M.P. 58° C.) in the yield of 380%.

*Analysis.*—Calcd. for $C_9H_8Br_4$ (percent): C, 25.74; H, 1.91; Br, 72.07. Found (percent): C, 25.77; H, 2.09; Br, 72.07.

EXAMPLE 9

To a mixture of allyl chloride (1 mole) and carbon tetrachloride (4.3 moles), there is added nickel peroxide containing 1.000 g.-atom of active oxygen, and the resultant mixture is stirred for 6 hours at 68° C. in nitrogen stream. The reaction mixture is treated as in Example 1 to give a compound corresponding to the formula: $CH_2ClCHClCH_2CCl_3$ (1,1,1,3,4 - pentachlorobutane) as a fraction boiling at 65 to 69° C./10 mm. Hg in the yield of 5%.

*Analysis.*—Calcd. for $C_4H_5Cl_5$ (percent): C, 20.35; H, 2.18; Cl, 76.95; M.W.: 230.4. Found (percent): C, 20.55; H, 2.20; Cl, 75.13; M.W.: 228.5.

EXAMPLE 10

To a mixture of allyl chloride (1 mole) and carbon tetrachloride (4.3 moles), there is added nickel peroxide containing 1.000 g.-atom of active oxygen, and the resultant mixture is shaken for 6 hours at 120° C. under 85 p.s.i. in an autoclave flushed with nitrogen stream. The reaction mixture is treated as in Example 1 to give a compound corresponding to the formula: $Cl(C_3H_5Cl)_2CCl_3$ as a fraction boiling at 120 to 125° C./4 mm. Hg in the yield of 6.3%.

*Analysis.*—Calcd for $C_7H_{10}Cl_6$ (percent): C, 27.39; H, 3.28; Cl, 69.32; M.W.: 306.9. Found (percent): C, 26.95; H, 3.29; Cl, 68.15; M.W.: 303.4.

EXAMPLE 11

To a mixture of allyl chloride (1 mole) and 12 N hydrochloric acid (2.3 moles), there is added nickel peroxide containing 0.200 g.-atom of active oxygen, and the resultant mixture is stirred for 4 hours at 35° C. in nitrogen stream. The oily phase is separated and treated as in Example 1 whereby a compound corresponding to the formula: $CH_2ClCHClCH_2Cl$ (1,2,3 - trichloropropane) is obtained as a fraction boiling at 147° C./100 mm. Hg in the yield of 70.0%.

*Analysis.*—Calcd. for $C_3H_5Cl_3$ (percent): C, 24.43; H, 3.42; Cl, 72.14. Found (percent): C, 24.49; H, 3.62; Cl, 71.39.

EXAMPLE 12

To a mixture of styrene (1 mole) and 12 N hydrochloric acid (1.2 moles), there is added nickel peroxide containing 0.133 g.-atom of active oxygen, and the resultant mixture is stirred for 4 hours at 40° C. in nitrogen stream. The oily phase is separated and treated as in Example 1 to give a compound corresponding to the formula: $Cl(C_8H_8)Cl((1,2$ - dichloroethyl)benzene) as a fraction boiling at 120° C./20 mm. Hg in the yield of 12.9% and a compound corresponding to the formula: $Cl(C_8H_8)_8Cl$ as a distillation residue melting at 94 to 95° C. in the yield of 14.2%.

*Analysis.*—

Calcd. for $C_8H_8Cl_2$ (percent): C, 54.88 H, 4.60; Cl, 40.51. Found (percent): C, 55.33; H, 4.90; Cl, 38.02.

Calcd. for $C_{64}H_{64}Cl_2$ (percent): C, 85.02; H, 7.13; Cl, 7.84; M.W.: 904.6. Found (percent): C, 85.22; H, 7.31; Cl, 7.47; M.W.: 891.3.

EXAMPLE 13

To a mixture of octene-1 (1 mole) and trichlorobromomethane (0.4 mole), there is added nickel peroxide containing 0.100 g.-atom of active oxygen, and the resultant mixture is stirred for 4 hours at 70° C. in nitrogen stream. The reaction mixture is treated as in Example 1 whereby a compound of the formula:

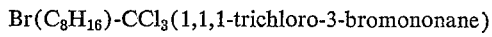

$Br(C_8H_{16})-CCl_3$ (1,1,1-trichloro-3-bromononane)

is obtained as a fraction boiling at 132° C./5 mm. Hg in the yield of 100.4%.

*Analysis.*—Calcd. for $C_9H_{16}BrCl_3$ (percent): C, 34.81 H, 5.19; Br. 25.73; Cl, 33.75; M.W.: 310.5. Found (percent): C, 35.19; H, 5.23; Br. 25.38; Cl, 33.17; M.W.: 313.0.

Having thus disclosed the invention, what is claimed is:

1. A process for the telomerization of taxogen selected from the group consisting of alkenes with a maximum of 8 carbon atoms, halogenoalkenes with a maximum of 8 carbon atoms, butadiene and isoprene, with a telogen selected from the group consisting of halogenomethanes, halogenoethanes and halogenoethylenes, excluding perfluoro compounds, and hydrochloric acid with the production of an addition product thereof in the form of a halogenated hyrocarbon, which comprises reacting the telogen with the taxogen in the presence of nickel peroxide at a temperature from ambient temperature to the decomposition temperature of one of the telogen, the taxogen and their addition product, the said nickel peroxide being the product of the treatment of a salt of nickel selected from the group consisting of nickel chloride, nickel bromide, nickel sulfate, nickel carbonate and nickel nitrate with an oxidizing agent selected from the group consisting of alkali hypohalite and alkali persulfate in aqueous alkaline medium at a temperature between 10° and 25° C., and containing about 0.3 to $0.4\times10^{-2}$ gram-atom of active oxygen per gram.

2. A process for the telomerization of a taxogen selected from the group consisting of ethylene, propylene, butene-1, isobutylene, octene-1, butadiene, isoprene, tetrafluoroethylene, cyclohexene, and allyl chloride and a telogen selected from the group consisting of carbon tetrachloride, carbon tetrabromide, chloroform, bromoform, dichloromethane, dibromomethane, trichlorobromomethane, dibromodifluoromethane, ethyl iodide, ethyl bromide, tetrachloroethylene, trichloroethylene and hydrochloric acid with the production of an addition product thereof in the form of a halogenated hydrocarbon, which comprises reacting the telogen with the taxogen in the presence of nickel peroxide at a temperature from ambient temperature to the decomposition temperature of one of the telogen, the taxogen and their addition product, the said nickel peroxide being the product of the treatment of a salt of nickel selected from the group consisting of nickel chloride, nickel bromide, nickel sulfate, nickel carbonate and nickel nitrate with an oxidizing agent selected from the group consisting of alkali hypohalite and alkali persulfate in aqueous alkaline medium at a temperature between 10° and 25° C., and containing about 0.3 to $0.4\times10^{-2}$ gram-atom of active oxygen per gram.

3. A process according to claim 1 for the reaction of said alkene with said halogenoalkane to produce said addition product thereof, which comprises reacting the alkene with the halogenoalkane in the presence of nickel peroxide at a temperature from ambient temperature to a decomposition temperature of one of the alkene, the halogenoalkane and the addition product, the said nickel peroxide being the product of the treatment of a salt of nickel selected from the group consisting of nickel chloride, nickel bromide, nickel sulfate, nickel carbonate and nickel nitrate with an oxidizing agent selected from the group consisting of alkali hypohalite and alkali persulfate in aqueous alkaline medium at a temperature between 10 and 25° C. and containing about 0.3 to $0.4\times10^{-2}$ gram-atom of active oxygen per gram.

4. A process according to claim 1 for the reaction of said alkene with said halogenoalkane to produce said addition product thereof, which comprises reacting the alkene with the halogenoalkane in the presence of nickel peroxide at a temperature from 50 to 150° C. in nitrogen stream, the said nickel peroxide being the product of the treatment of nickel sulfate with sodium hypochlorite in aqueous medium at a temperature between 10 and 25° C. and containing about 0.3 to $0.4\times10^{-2}$ gram-atom of active oxygen per gram.

5. A process according to claim 1 for the reaction of said halogenoalkene with said halogenoalkane to produce said addition product thereof, which comprises reacting the halogenoalkene with the halogenoalkane in the presence of nickel peroxide at a temperature from ambient temperature to a decomposition temperature of one of the halogenoalkene, the halogenoalkane and the addition product, the said nickel peroxide being the product of the treatment of a salt of nickel selected from the group consisting of nickel chloride, nickel bromide, nickel sulfate, nickel carbonate and nickel nitrate with an oxidizing agent selected from the group consisting of alkali hypohalite and alkali persulfate in aqueous alkaline medium at a temperature between 10 and 25° C., and containing about 0.3 to $0.4\times10^{-2}$ gram-atom of active oxygen per gram.

6. A process according to claim 1 for the reaction of said halogenoalkene with hydrogen chloride to produce said addition product thereof, which comprises reacting the halogenoalkene with the hydrogen chloride in the presence of nickel peroxide at a temperature from ambient temperature to a decomposition temperature of one of the halogenoalkene, the hydrogen chloride and their addition product, the said nickel peroxide being the product of the treatment of a salt of nickel selected from the group consisting of nickel chloride, nickel bromide, nickel sulfate, nickel carbonate and nickel nitrate with an oxidizing agent selected from the group consisting of alkali hypohalite and alkali persulfate in aqueous alkaline medium at a temperature between 10 and 25° C., and containing about 0.3 to $0.4 \times 10^{-2}$ gram-atom of active oxygen per gram.

References Cited

UNITED STATES PATENTS

| | | | |
|---|---|---|---|
| 1,998,538 | 4/1935 | Finkelstein et al. | 260—651 |
| 3,066,122 | 11/1962 | Brinker et al. | 260—653.1 T |
| 3,213,149 | 10/1965 | Takahashi et al. | 260—658 C |

OTHER REFERENCES

Friedlina et al., Telomerization and New Synthetic Materials, p. 22, 1961, copy in art unit 126, call No. TP 986A2F73C.2.

DANIEL D. HORWITZ, Primary Examiner

U.S. Cl. X.R.

260—653.1 T, 658 C, 651 R, 663